United States Patent [19]

Schuettpelz

[11] Patent Number: 4,511,977
[45] Date of Patent: Apr. 16, 1985

[54] PUNCH MARKER HEIGHT CONTROL

[75] Inventor: Daryl Schuettpelz, Milwaukee, Wis.

[73] Assignee: C.R.O. Inc., Menomonee Falls, Wis.

[21] Appl. No.: 359,238

[22] Filed: Mar. 18, 1982

[51] Int. Cl.³ .............................................. G06F 15/46
[52] U.S. Cl. .................................... 364/475; 364/569; 377/16
[58] Field of Search ............... 364/475, 569, 468, 472, 364/143, 183, 550, 551, 474; 377/16, 20, 19, 26

[56] References Cited

U.S. PATENT DOCUMENTS

| | | | |
|---|---|---|---|
| 3,321,704 | 5/1967 | Mann | 377/16 |
| 3,839,628 | 10/1974 | Higgins et al. | 377/16 X |
| 3,841,149 | 10/1974 | Edwin et al. | 364/551 X |
| 3,916,165 | 10/1975 | Komsa | 377/16 |
| 4,142,238 | 2/1979 | Brandt et al. | 377/20 X |
| 4,166,246 | 8/1979 | Matt | 377/16 X |
| 4,245,316 | 1/1981 | Koikawa et al. | 364/569 X |
| 4,272,812 | 6/1981 | Svensson | 364/475 |
| 4,289,956 | 9/1981 | Asami | 377/19 |
| 4,363,468 | 12/1982 | Noe | 364/475 X |
| 4,365,306 | 12/1982 | House et al. | 364/551 |

Primary Examiner—Edward J. Wise
Attorney, Agent, or Firm—Andrus, Sceales, Starke & Sawall

[57] ABSTRACT

A height control for use in connection with punch marking a metallic plate and wherein the distance between the punch marking tool and the plate surface undesirably varies at random due to warping of the metal sheet or deviations from desired tolerance. A microprocessor counter measures the time interval during which the punch marker is in contact with the metal plate. This time interval is compared with a predetermined time range that is indicative of an "in position" condition for the punch marking tool. Detection of time intervals that do not fall within the predetermined "in position" time range results in a pulsed correction signal that activates an electric motor which in turn varies the height of the punch marking tool via a rack and pinion assembly mounted on the tool assembly.

4 Claims, 2 Drawing Figures

PUNCH MARKER HEIGHT CONTROL

BACKGROUND AND SUMMARY OF THE INVENTION

This invention relates to a height control system for monitoring and adjusting the distance between a reciprocating punch marking tool and a metal plate workpiece.

Punch marking tools are often used in conjunction with welding machines or flame cutting machines in order to mark or score the workpiece so as to indicate the correct location for a future work operation such as bending or bracing.

In that the metal plate that serves as the workpiece seldom provides a perfectly even surface the distance between the tip of the punch marker and the plate surface varies. Since the length of the stroke of the reciprocating punch marker is constant the varying punch to workpiece distance results in occasions where the punch marker fails to mark the workpiece and other instances where a much deeper mark than is necessary is punched into the plate. Thus, where the distance between the punch marker and the workpiece is in excess of the optimum distance, the punch marker fails to produce a discernable indicia on the workpiece and in situations where the marker to plate distance is less than the optimum, the plate is badly deformed and the tip life for the punch is greatly reduced due to the excessive shock.

Heretofore, the distance between the punch marker and the metal plate has been monitored by sensing the electrical capacitance between the tip of the tool and the surface of the workpiece. This procedure has proven to be unreliable due to the fact that a very small capacitance is being measured and its value easily drifts when exposed to the external influences present in a welding or flame cutting environment. The known capacitance height sensing system also has required a substantial metal area in order for it to function properly. Therefore, such a system has encountered difficulties as the punch press approached the edge of the workpiece.

It is a task of the present invention to provide a punch marker height control that is impervious to the external influences present in a flame cutting or welding operation.

It is a further task of the invention to provide a height control that performs equally as well at the edge of the workpiece as in the middle of the plate.

In accordance with one aspect of the invention, a height control for a punch marker is provided and which is responsive to a timing mechanism that measures the time interval during which the marking tool is in contact with the workpiece.

In accordance with another aspect of the invention, the height control is provided with an error detection system which compares the sensed time interval with a predetermined time range that is indicative of an "in position" condition for the marking tool. The error detection system generates a correction signal upon determining that the sensed time interval is outside of the predetermined time range.

In accordance with yet another aspect of the invention, the height control is provided with a height adjustment assembly that is operable by the correction signal generated by the error detection system. The height adjustment assembly adjusts the vertical position of the punch marker relative to the workpiece in response to the correctional signal generated by the error detection system.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
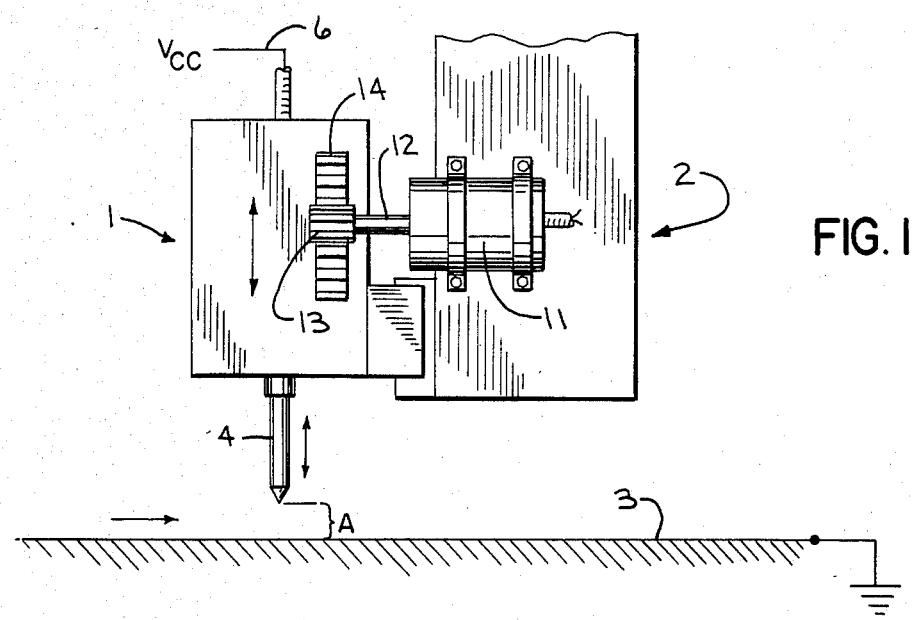
FIG. 1 is a generally schematic front end view of a punch marker incorporating the concepts of the invention.

The preferred embodiment incorporating the concepts of the invention is illustrated generally in FIG. 1 wherein a punch marking tool 1 is mounted for use along side a welding or flame cutting machine 2 that performs an operation on a metal plate 3.

Punch marking tool 1 is a riveter type tool such as the 43R series marketed by Gardner-Denver. As welding or flame cutting machine 2 moves along metal sheet 3, punch marking tool 1 is activated occasionally in order to mark plate 3 for future operations at that spot such as bending or the welding on of a support bracket. Occasionally metal plate 3 is not completely level due to the fact that its thickness may vary, it may be warped, or it may be positioned at an incline. Thus, the distance "A" between tip 4 of tool 1 and metal plate 3 tends to vary as machine 2 moves along the plate. When the distance between tip 4 and metal plate 3 is too great, marking tool 1 will fail to leave a discernable mark on plate 3 and when the distance between tip 4 and plate 3 is too small, metal plate 3 is excessively deformed and the tip life of the marking tool is greatly reduced.

Figure 2:
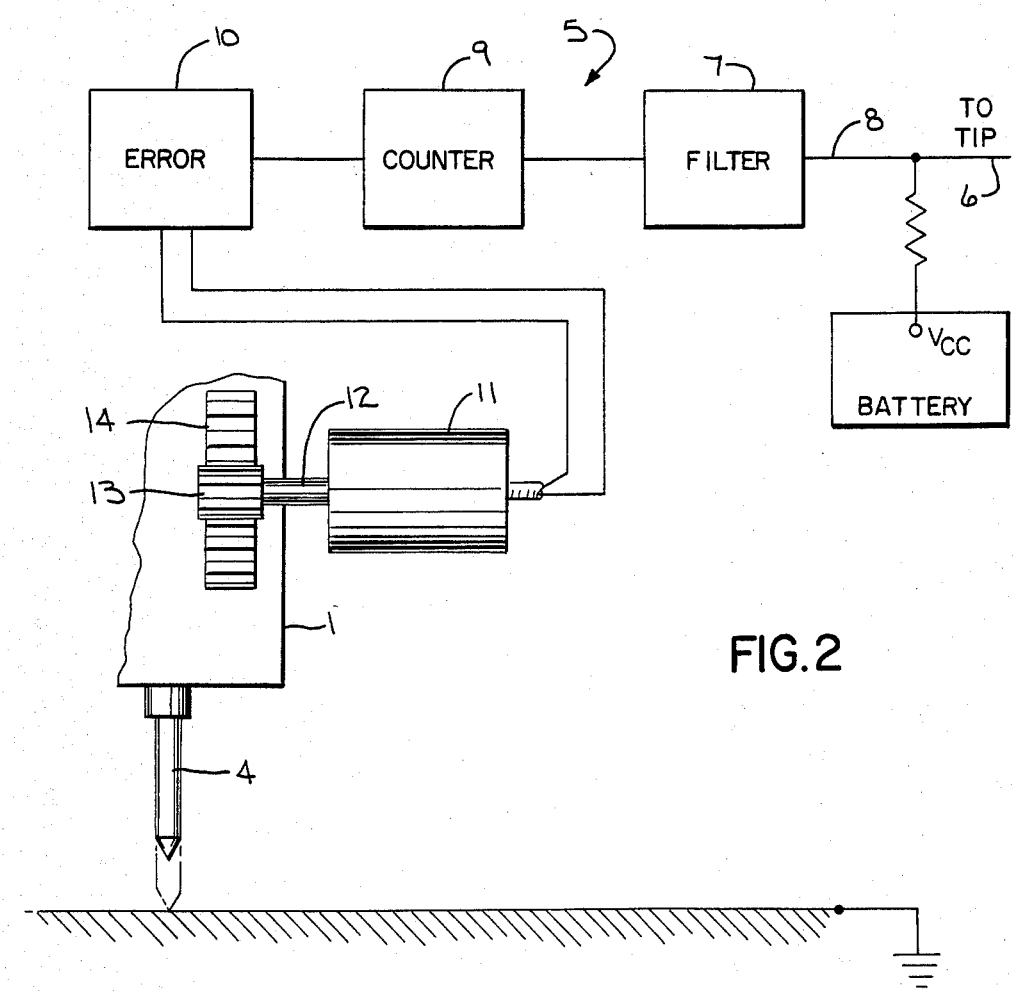
FIG. 2 is a schematic representation of the various components comprising the height control system of the present invention.

In order to compensate for the variations in distance between tip 4 and metal 3, punch marking tool 1 is provided with a height monitoring and control system 5, as shown in FIG. 2.

Monitoring and control system 5 utilizes a means, such as a battery, to apply a reference voltage $V_{cc}$ between tip 4 and metal sheet 3 by means of electrical lead 6. Reference voltage $V_{cc}$ is also applied to a filter 7 of conventional type by means of lead 8. Filter 7 is used to clean up the electrical wave form and may consist of a high speed optical isolator.

When tip 4 is in its retracted position, the electrical circuit that includes tip 4 and grounded plate 3 is open and therefore the circuitry that includes filter 7 experiences a constant straight line voltage. When tip 4 is in contact with metal plate 3, the circuit is closed and the reference voltage is grounded and the straight line voltage that was being supplied to filter 7 drops to ground.

A counter 9 connected to filter 7 is activated upon sensing that reference voltage $V_{cc}$ has dropped to ground and the counter continues to operate until it senses that the reference voltage $V_{cc}$ has returned to its normal level. Thus, counter 9, which may be of any conventional microprocessor type, measures the time period in which tip 4 is in contact with plate 3.

The total time period for a count recorded by counter 9 is then compared to a predetermined set reference count by a conventional error detection unit 10 which is connected to the counter output. The predetermined reference count constitutes a time range that is indicative of optimum tip to plate distance. Should tip 4 be too close to plate 3, then counter 9 will register a longer than normal time period and error detection unit 10 will determine that the measured time period exceeds the predetermined reference count. Should tip 4 be too far from plate 3 then counter 9 will register a lower than normal time period and error detection unit 10 will determine that the measured time period is below the predetermined reference count.

Upon determining that the measured time frame is in excess of the set predetermined reference count i.e. tip 4 is too close to plate 3, the output of error detection unit 10 will provide an electrical pulse to a connected drive unit 11 which is secured to machine 2. The electrical pulse is such that shaft 12 of drive unit 11 is rotated clockwise so that pinion 13 will cause upward movement of rack 14 mounted on marking tool 1 resulting in an incremental upward movement of marking tool 1. Similarly, should error detection unit 10 determine that the measured time frame is less than the predetermined reference count, than an electrical pulse is provided to drive unit 11 such that pinion 13 is rotated in a counter clockwise direction so that rack 14 and punch marking tool 1 are moved down towards plate 3 an incremental distance.

Thus, every time punch marking tool 1 is activated, the duration of contact between tip 4 and metal plate 3 is monitored and if the monitored time does not fall within a predetermined time range indicative of optimum tip to plate distance then punch tool 1 is moved an incremental distance towards or away from plate 3. In that the height monitoring and control system of the present invention is based on time measurement rather than on the measurement of electrical capacitance, it is far more reliable and is not adversely effected by the noise and electrical interference associated with the welding or cutting tool or by the lack of surface area present as the tool approaches the edge of the plate.

Various modes for carrying out the invention are contemplated as being within the scope of the following claims particularly pointing out and distinctly claiming the subject matter which is regarded as the invention.

I claim:

1. A height control system for monitoring and adjusting the distance between a reciprocating punch marking tool and a workpiece comprising:

timing means for measuring the time interval during which the marking tool is in contact with the workpiece, error detection means connected to the output of said timing means for comparing said time interval with a predetermined time range, said predetermined time range being indicative of an "in position" condition for the marking tool, said error detection means generating a correction signal upon determining that said time interval is outside said predetermined time range, and height adjustment means operatively connected to the output of said error detection means for adjusting the height of the marking tool in response to said correction signal generated by said error detection means.

2. The height control system defined in claim 1 wherein the workpiece is electrically conductive and grounded and said timing means comprises:

means to apply a reference voltage across the punch marking tool and the grounded workpiece so that upon contact by the punch marking tool with the grounded workpiece the value of said reference voltage drops to substantially zero, and a microprocessor counter for monitoring said reference voltage, said counter being activated upon detection of a substantially zero value for said reference voltage so that said counter detects punch marking tool contact with the workpiece and measures the duration of such contact.

3. The height control system defined in claim 1 wherein said height adjustment means comprises:

a rack and pinion assembly operably connected to the punch marking tool, and motive means operably connected to said pinion, said motive means being activated by said correction signal generated by said error detection means, so that the vertical position of the punch marking tool relative to the workpiece is adjusted responsive to said generated correction signal.

4. A height control system for monitoring and adjusting the distance between a reciprocating punch marking tool and a grounded electrically conductive workpiece comprising:

means to apply a reference voltage applied across the punch marking tool and the grounded workpiece so that upon contact by the punch marking tool with the grounded workpiece the value of the reference voltage drops to substantially zero, a microprocessor counter for monitoring said reference voltage, said counter being activated upon detection of a substantially zero value for said reference voltage so that said counter detects punch marking tool contact with the workpiece and measures the time interval during which the punch marking tool is in contact with the workpiece, error detection means for comparing said time interval with a predetermined time range, said predetermined time range being indicative of an "in position" condition for the punch marking tool, said error detection means generating a correction signal upon determining that said time interval is outside said predetermined time range, a rack and pinion assembly operably connected to the punch marking tool, and motive means operably connected to said pinion, said motive means being activated by said correction signal generated by said error detection means, so that the vertical position of the punch marking tool relative to the workpiece is adjusted responsive to said generated correction signal.

* * * * *